United States Patent [19]
Richards

[11] 3,776,748
[45] Dec. 4, 1973

[54] METHOD OF PREPARING SURFACING COMPOSITION FOR ROADS; AIRFIELD RUNWAYS AND THE LIKE

[75] Inventor: Dennis Maunder Richards, Cornwall, England

[73] Assignee: English Clays Lovering Pochin & Company Limited, St. Austell, Cornwall, England

[22] Filed: June 20, 1972

[21] Appl. No.: 264,420

Related U.S. Application Data

[63] Continuation of Ser. No. 811,166, March 27, 1969, abandoned.

[52] U.S. Cl.............. 106/280, 106/96, 106/281, 106/282, 106/283, 106/97
[51] Int. Cl. ... C09d 3/24, C08h 13/00, C08h 17/02
[58] Field of Search............ 106/96, 97, 280–284, 106/288 B, 288 Q

[56] References Cited
UNITED STATES PATENTS

| | | | |
|---|---|---|---|
| 2,758,033 | 8/1956 | Burney, Jr. et al. | 106/97 |
| 2,987,411 | 6/1961 | Minnick | 106/97 |
| 3,078,175 | 2/1963 | DeLisle | 106/97 |
| 3,230,103 | 1/1966 | Minnick | 106/117 |
| 3,432,322 | 3/1969 | Rogers | 106/281 |
| 3,501,323 | 3/1970 | Moorehead | 106/97 |
| 3,076,717 | 2/1963 | Minnick | 106/97 X |

*Primary Examiner*—Joseph L. Schofer
*Assistant Examiner*—Joan B. Evans
*Attorney*—Stevens, Davis, Miller & Mosher

[57] ABSTRACT

A method of producing artificial roadstones for use in bituminous surfacing compositions for roads, airfield runways and the like. The artificial road-stones are produced by a method which comprises the steps of (a) extruding a mixture comprising water, a bonding material, at least 50 percent by weight of which is composed of materials capable of forming on reaction with water stable, substantially insoluble, hydrated calcium silicates and/or calcium aluminates, and a granular aggregate, and (b) hardening the extruded composition to form the desired artificial roadstones. The bonding material constitutes from 5 to 100 percent by weight of the solids in the mixture to be extruded and has a particle size distribution such that substantially all thereof passes a No.100 mesh British Standard sieve and the granular aggregate constitutes from 0 percent to 95 percent by weight of the solids in the mixture and is composed wholly or substantially wholly of material passing a ⅜ inch mesh British Standard sieve and retained on a No.100 mesh British Standard sieve.

9 Claims, 1 Drawing Figure

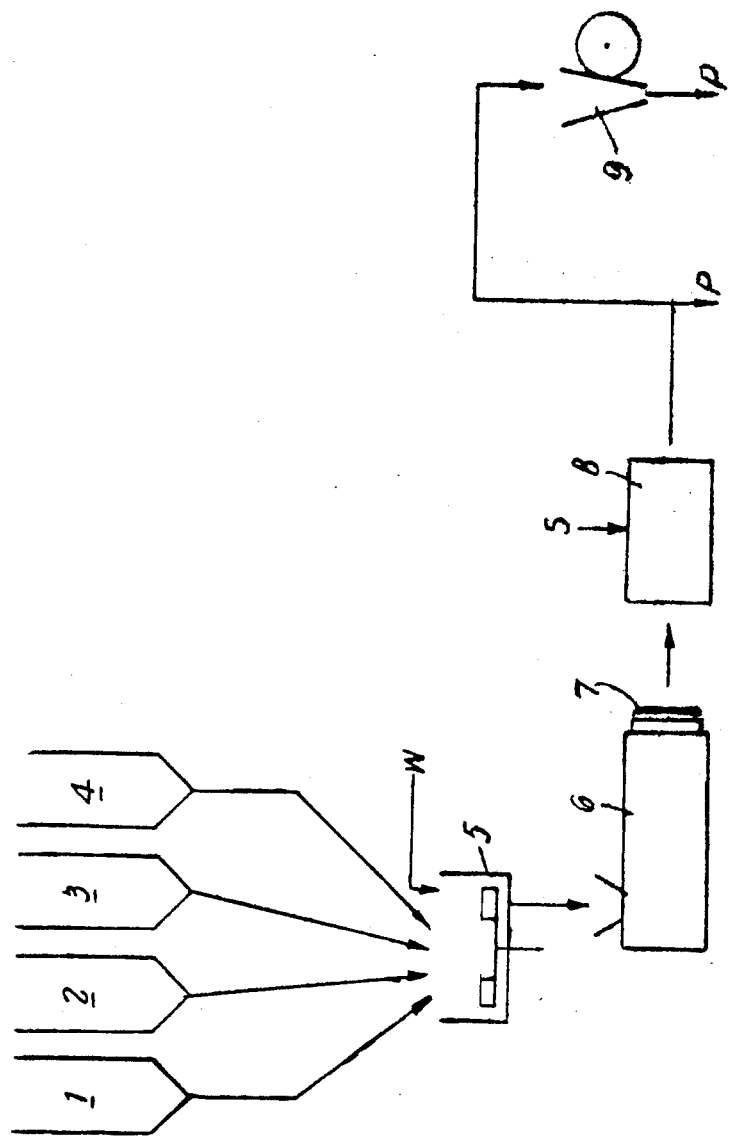

METHOD OF PREPARING SURFACING COMPOSITION FOR ROADS; AIRFIELD RUNWAYS AND THE LIKE

This is a continuation, of application Ser. No. 811,166, filed Mar. 27, 1969 now abandoned.

BACKGROUND OF THE INVENTION

This invention relates to roads, airfield runways and the like and, more particularly but not exclusively, is concerned with an artificial roadstone suitable for use with bituminous surfacing compositions.

A bituminous surfacing composition is a mixture of aggregates and a binder, the binder essentially comprising a bituminous material. By the term "bituminous material" there is meant herein a viscous, semi-solid material which can be easily melted and which has marked agglomerating properties at atmospheric temperatures. Conventional aggregates can be classified into eleven main groups viz. (1) artificial, e.g. slags, clinker etc., (2) basalt, (3) flint, (4) gabbro, (5) granite, (6) gritstone, (7) hornfels, (8) limestone, (9) porphyry, (10) quartzite and (11) schist. Bituminous surfacing compositions comprise two main categories, namely asphalt, in which the binder comprises bitumen, and tarmacadam, in which the binder comprises tar. For roads carrying moderate to heavy traffic, i.e., more than about 450 commercial vehicles per day, it is usual practice to construct the surface of the road in two layers i.e. a base course of thickness 1¾ to 2½ inches and a top, wearing course of thickness ¾ to 1½ inch, the wearing course containing an aggregate consisting of pieces of smaller mean size than that used in the base course. One type of wearing course which is frequently used is known as rolled asphalt and is produced from a bituminous surfacing composition comprising aggregate and relatively hard bitumen. When required for use, the bituminous surfacing composition is heated to a temperature at which it can be spread by rakes or a mechanical spreader, and then roadstones, in the form of chippings, are rolled into the composition to impart anti-skid properties thereto. The bituminous surfacing compositions generally used for rolled asphalt wearing courses for heavy traffic have the following range of compositions:

| | |
|---|---|
| A. Coarse aggregate | 0 to 55% by weight |
| B. Fine aggregate | 20 to 80% by weight |
| C. Filler | 4 to 18% by weight |
| D. Bitumen | 5 to 13% by weight |

The coarse aggegate A) comprises pieces which are retained on a No. 7 mesh British Standard sieve and which are classified to give as nearly as possible pieces of uniform size and shape. The size of the pieces should be not more than one-half and not less than one-third the thickness of the wearing course and should lie broadly in the range ¼ to ¾ inch. The materials most commonly used as coarse aggregate include broken stone, mineral ore, slag and gravel. The fine aggregate B) comprises particles having a size distribution such that substantially all the material passes a No. 7 mesh British Standard sieve and is retained on a No. 200 mesh British Standard sieve. The materials most commonly used for fine aggregate include natural sand or crushed rock. The filler 0), which is required to stiffen and strengthen the bitumen and fill up the voids in the composition to render the surface impervious to water, comprises material all of which passes a No. 200 mesh British Standard sieve. Practically any inert mineral powder of the required fineness is suitable for use as a filler, but limestone dust is most commonly used although Portland cement and slate dust are also frequently used.

The properties of an aggregate which are of most importance in road making are its resistance to crushing, impact, abrasion and polishing, its specific gravity and water absorption, and its grading and particle shape. If an aggregate is to be used in the wearing course of a road or the like carrying heavy traffic, more especially if it is to be rolled into the wearing course to impart anti-skid properties thereto, the resistance of the aggregate to crushing, abrasion and polishing are of particular importance. Tests for measuring the resistance of an aggregate to crushing, abrasion and polishing are described in British Standard 812:1967, pages 71–97, and the results of these tests are recorded as the "aggregate crushing value", the "aggregate impact value" the "10percent fines value", the "aggregate abrasion value" and the "polished stone value." The "aggregate crushing value" varies for conventional aggregates from about 10 percent for some hornfels to about 30 percent for some limestones; the "aggregate impact value" varies for conventional aggregates from about 7 percent to about 25 percent, the "10 percent fines value" varies for conventional aggregates from about 40 tons for the strongest aggregates down to as little as 1 ton for material such as chalk; the "aggregate abrasion value" varies from below 1 percent for some flints to over 20 percent for aggregates that would normally be regarded as too soft for use in the wearing course of a road surface; and the "polished stone value" varies from about 27 for certain limestones to about 74 for certain members of the gritstone class. For the wearing course of a road or the like carrying heavy traffic it is important to use as the aggregate, particularly the coarse aggregate, of a bituminous surfacing composition a material having a high polished stone value i.e., greater than 62, and a high resistance to crushing and abrasion, i.e., a maximum aggregate impact value of 30 percent, a maximum aggregate crushing value of 30 percent and a maximum aggregate abrasion value of 20 percent; but natural stones having these properties are in short supply and, as a consequence, expensive.

It is an object of the present invention to provide a method of producing aritifical roadstone which is suitable for use as an aggregate in a bituminous surfacing composition for a wearing course of a road, airfield runway or the like, having a high polished stone value as well as a high resistance to crushing and abrasion.

SUMMARY OF THE INVENTION

According to one aspect of the present invention, therefore, there is provided a method of producing an artificial roadstone which method comprises the steps of (a) extruding a mixture comprising water, a bonding material, at least 50 percent by weight of which is composed of materials capable of forming on reaction with water stable, substantially insoluble hydrated calcium silicates and/or calcium aluminates, and optionally a granular aggregate, wherein the bonding material constitutes from 5 to 100 percent by weight of the solids in said mixture and has a particle size distribution such that substantially all thereof passes a No. 100 mesh British Standard sieve and wherein the granular aggregate constitutes from 0 percent to 95 percent by weight of the solids in said mixture and is composed wholly or substantially wholly of material passing a ⅜ inch mesh British Standard sieve and retained on a No. 100 mesh British Standard sieve, and (b) hardening the extruded composition.

In another aspect, the present invention provides a bituminous surfacing composition which comprises a mixture of an aggregate and a bituminous material, the aggregate comprising artifical roadstones produced by the method of the invention.

DESCRIPTION OF THE PREFERRED EMBODIMENTS

The bonding material can be a Portland cement or a high alumina cement, but preferably comprises a mixture of silica flour or other finely divided siliceous material and lime, which can be in the form of hydrated lime, quick lime or spent calcium carbide or a mixture of two or more thereof, part of which mixture can be replaced by a Portland cement and/or a high alumina cement. The composition of the bonding material is preferably such that the molar ratio of CaO to $SiO_2$ is in the range 1 : 1 to 1 : 3 and preferably in the range 1 : 1.5 to 1 : 2.5. The finely divided siliceous material can be, for example, slate powder, which generally contains from about 40 percent to about 50 percent by weight of free silica, or a ball clay which may contain up to about 50 percent by weight of free silica. The bonding material should have a particle size distribution such that substantially all thereof passes a No. 100 mesh British Standard sieve. At least 50 percent of the bonding material must comprise active material i.e., material capable of forming on reaction with water stable, substantially insoluble hydrated calcium silicates and/or calcium aluminates. The bonding material can also contain inert material which can include, for example, a pigment which enables an artifical roadstone of a desired colour to be obtained.

The granular aggregate used in forming the artifical roadstone of the present invention consists wholly or substantially wholly of material passing a ⅜ inch British Standard sieve and retained on a No. 100 mesh Bristish Standard sieve. The granular aggregate can be a natural or synthetic material. Examples of suitable aggregates are the conventional aggregates given in British Standard 812, 1967, pages 15–16, viz. artificial, e.g. slags, clinker etc., basalt, flint, gabbro, granite, gritstone, hornfels, limestone, porphyry, quartzite and schist.

Advantageously, the granular aggregate will comprise at least 20 percent by weight of material passing a No. 25 mesh British Standard sieve.

The bonding material, optionally after mixing with a granular aggregate in proportions falling within the range given above, is blended with water in order to achieve a mixture of the desired consistency for extruding. It will be appreciated that the amount of water required will depend on the particle size of the dry mix. For example a dry mix containing a high proportion of coarse particles will require less water than one containing mostly fine particles. If a high proportion of coarse aggregate is used it is sometimes advantageous to include a highly plastic material, such as ball clay, in the bonding material and this will again increase the amount of water required. It has been found that, generally, the amount of water required will lie in the range of from 5 percent to 50 percent by weight based on the total weight of the dry mix.

After blending with water the mixture is then fed to an extruder which may be, for example, of the screw type. The extruder is provided with a nozzle which is perforated with one or more holes of the desired shape and size. The shape of the holes is important as this determines the shape of the finished roadstone and it has been found to be advantageous to extrude the material through holes of circular, rectangular, e.g. square, triangular or diamond-shaped section. For most purposes, it has been found that the size of the holes should be such that the width at the widest part of any hole should be not more than 2 inches and not less than ⅜ inch. It is advantageous to provide a mechanism to wipe the surface of the extruder nozzle so that the ribbons of extruded material are broken into short lengths of not more than about 2 inches and not less than ⅜ inch. The extruded composition is then hardened. Unless the bonding material contained a significant proportion of a high alumina cement, the hardening is preferably done by treatment with steam, advantageously in an autoclave at a steam pressure of at least 100 p.s.i.g. and for a time generally in excess of 1 hour. Most preferably the extruded composition is hardened by treatment with steam at a pressure in the range from 220 to 240 p.s.i.g. for from 3 to 5 hours. Alternatively if the extruded composition contains a significant proportion of a high alumina cement, the hardening step is preferably carried out under ambient conditions.

After hardening, the resulting material can be further reduced in size by crushing, but this will not usually be necessary as the size of the holes in the extruder nozzle and the speed of rotation of the wiping device will be chosen to give a product of the desired size.

For a better understanding of the method of the invention and to show how the same may be carried into effect, reference will now be made, by way of example, to the accompanying drawing, which is a schematic diagram of an installation suitable for carrying out the method of the invention.

Storage bins 1, 2, 3 and 4 contain stocks of the dry ingredients used for making the mixture, viz. aggregate, lime, e.g. quick lime or hydrated lime, silica flour and Portland cement. Although only four bins are shown it will be understood that more storage bins can be provided when additional ingredients, e.g. ball clay, are added to the mixture. The dry ingredients are mixed with the appropriate quantity of water W in a mixer 5, and the wet mix is then fed to an extruder 6 provided with a wiper mechanism 7 to break up the extruded material as it is forced through the extruder nozzle. The broken extruded portions are hardened in an autoclave 8 supplied with steam S at an elevated pressure and the hardened material is then passed to storage or, if desired, further reduced in size by means of a jaw crusher 9 before being stored.

The invention is further illustrated by the following Examples.

EXAMPLE 1

Four dry mixes were prepared using the following materials:

1. Bonding material: this consisted of a mixture of silica flour, hydrated lime and ordinary Portland cement all of which had been screened through a No. 100 mesh British Standard sieve and were present in the following proportions by weight:

|                 | % by weight |
|-----------------|-------------|
| silica flour    | 65.7        |
| hydrated lime   | 29.8        |
| Portland cement | 4.5         |

The molar ratio or CaO to SiO$_2$ was 1 : 2.0.

2. Granular aggregate: this consisted of sand which had been produced as a by-product of china clay extraction and which had the following particle size distribution:

| | |
|---|---|
| % by weight passing ⅜ inch British Standard sieve | 100 |
| % by weight passing a No. 25 mesh British Standard sieve | 83.3 |
| % by weight retained on a No. 100 mesh British Standard sieve | 100 |

The granular aggregate was mixed with the bonding material in the proportions shown in Table I below and sufficient water was added to each mix to give the correct consistency for extruding. Each mix was then extruded through a nozzle having 100 holes each in the shape of an equilateral triangle of ¾ inch size. The "green" pieces formed by extruding each mix were hardened in an autoclave at a steam pressure of 235 p.s.i.g. for 4 hours. The hardened artificial roadstones from each batch were then tested for aggregate crushing strength and polished stone value and the results are shown in Table I below.

TABLE I

| Batch | Dry Mix % by wt. of bonding material | % by wt. of aggregate | % by wt. of water added to dry mixture | Aggregate crushing value | Polished stone value |
|---|---|---|---|---|---|
| 1 | 100 | 0  | 32  | 28.2% | 68 |
| 2 | 80  | 20 | 23.2 | 25.9% | 69 |
| 3 | 60  | 40 | 21  | 21.5% | 71 |
| 4 | 40  | 60 | 11  | 19.6% | 72 |

EXAMPLE 2

A dry mix was prepared using the following materials:

1. Bonding material: this consisted of a mixture of silica flour, hydrated lime, ordinary Portland cement, and a ball clay of high plasticity having a modulus of rupture of 923 lbf/in$^2$ when dried at 110°C. and comprising 53 percent by weight of particles less than 2 microns equivalent spherical diameter. The components of the bonding material were present in the following proportions by weight.

|                 | % by weight |
|-----------------|-------------|
| silica flour    | 56.0        |
| hydrated lime   | 18.3        |
| Portland cement | 12.8        |
| ball clay       | 12.8        |

The molar ratio of CaO to SiO$_2$ was 1 : 2.2.

2. Granular aggregate: this was the same as that used in Example 1.

The bonding material was mixed with the granular aggregate in the proportions 39 parts by weight of bonding material to 61 parts by weight of granular aggregate. 16 percent by weight of water, based on the total weight of the dry mix, was added and the wet mixture was extruded through a nozzle of the same type as that described in Example 1.

The "green" pieces were hardened in an autoclave at a steam pressure of 235 p.s.i.g. for 4 hours. The hardened pieces were tested for aggregate crushing strength and polished stone value and the results obtained are given below:

| | |
|---|---|
| aggregate crushing value | 23.3% |
| polished stone value | 75 |

The artificial roadstones manufactured above were incorporated in a flexible pavement designed to carry a traffic flow of more than 4,500 commerical vehicles per day. The pavement was laid on a subgrade of compacted, well-drained, silty clay and consisted of an 8 inch thickness of crushed rock and sand as a sub-base, an 8 inch thickness of bitumen macadam as a base and a surface which comprised a 2½ inch thick base course and a 1½ inch thick wearing course both consisting of rolled asphalt. The wearing course contained 25 percent by weight of coarse rock aggregate, 57 percent by weight of river-bed sand, 10 percent by weight of limestone filler and 8 percent by weight of bitumen, and into this wearing course while still warm there was rolled a coating of artificial roadstones distributed at the rate of 100 square yard/ton (12.2 Kg/m$^2$). The artificial roadstones, which were prepared by the method of the invention, were coated with 2 percent by weight, based on the weight of roadstones, of bitumen having a penetration at 77° F (25° C) of 60. 2 percent by weight of a limestone filler, based on the weight of the roadstones, was also added to enable the roadstones to carry the specified proportion of bitumen.

EXAMPLE 3

A dry mix was prepared using the following materials:

1. Bonding material: this consisted of a mixture of silica flour, hydrated lime, ordinary Portland cement and ball clay in the following proportions by weight:

|                 | % by weight |
|-----------------|-------------|
| silica flour    | 43.6        |
| hydrated lime   | 23.7        |
| Portland cement | 10.9        |
| ball clay       | 21.7        |

The molar ratio of CaO to SiO$_2$ was 1 : 1.8.

2. Granular aggregate: this was the same as that used in Example 1.

The bonding material was mixed with the granular aggregate in the proportion 46 parts by weight of bonding material to 54 parts by weight of granular aggregate. 19 percent by weight of water, based on the total weight of the dry mix, was added and the wet mixture was extruded through a nozzle of the same type as that described in Example 1.

The "green" extruded pieces were then hardened in an autoclave at a steam pressure of 235 p.s.i.g. for 4 hours. The hardened pieces were tested for aggregate crushing strength and polished stone value and the results are given below.

| | |
|---|---|
| aggregate crushing value | 29.4% |
| polished stone value: | 76 |

EXAMPLE 4

A dry mix was prepared using the same bonding material as in Example 2 and as aggregate a batch of crushed basalt comprising particles ranging in size from ⅛ inch British Standard sieve to No. 100 mesh British Standard sieve. The bonding material was mixed with the aggregate in the proportions 39 parts by weight of bonding material to 61 parts by weight of aggregate. 17 percent by weight of water based on the total weight of the dry mix was added and the wet mix was extruded through the same nozzle as used in the previous Examples.

The "green" pieces were hardened in an autoclave at a steam pressure of 235 p.s.i.g. for 4 hours. The hardened pieces were then tested for aggregate crushing value and polished stone value and the results obtained are given below:

| aggregate crushing value: | 21.0 % |
|---|---|
| polished stone value: | 80 |

In addition to their use in bituminous surface compositions, the artificial roadstones of the present invention can be used, for example, in concrete surfaces etc.

I claim:

1. A method of preparing a bituminous surfacing composition comprising
   a. extruding through holes of a size such that the width of the holes at the widest part is in the range of from ⅜ inch to 2 inches, a mixture comprising water in an amount of from 5 to 50 percent by weight of the total dry weight of the mixture,
   an inorganic bonding material at least 50 percent by weight of which is composed of materials capable of forming on reaction with water at least one of stable, substantially insoluble hydrated calcium silicates and calcium aluminates, the remainder of said bonding material being inert material incapable of forming on reaction with water at least one of stable, substantially insoluble hydrated calcium silicates and calcium aluminates and
   an inorganic natural or synthetic granular aggregate wherein said bonding material constitutes from 5 to 100 percent by weight of the solids in said mixture and has a particle size distribution such that substantially all thereof passes a No. 100 mesh British Standard sieve and
   wherein said granular aggregate constitutes from 0 percent to 95 percent by weight of the solids in said mixture and is composed wholly or substantially wholly of material passing a ⅜ inch mesh British Standard sieve and retained on a No. 100 mesh British Standard sieve,
   b. dividing the extruded mixture into lengths of not more than 2 inches and not less than ⅜ inch,
   c. hardening the lengths of extruded mixture to form artificial roadstones having a high polished stone value and a high resistance to crushing and abrasions, and
   d. incorporating the artificial roadstones in a bituminous material.

2. A method according to claim 1, wherein the mixture of water, bonding material and granular aggregate is extruded through holes of substantially circular, rectangular, triangular or diamond section and of a size such that the width of the holes at the widest part is in the range of from ⅜ inch to 2 inches.

3. A method according to claim 2 wherein the extruded material is divided into lengths of not more than 2 inches and not less than ⅜ inch before being hardened.

4. A method according to claim 1, wherein the bituminous material is bitumen.

5. The method of claim 1 wherein said mixture of water, bonding material and granular aggregate is extruded through holes of substantially circular, rectangular, triangular or diamond section.

6. The method of claim 1 wherein said bonding material has a composition such that the molar ratio of CaO to $SiO_2$ is in the range 1 : 1.5 to 1 : 2.5.

7. The method of claim 1 wherein said bonding material is composed of material at least 50 percent by weight of which is capable of forming on reaction with water stable, substantially insoluble hydrated calcium silicates and wherein the extruded material is hardened by treatment with steam.

8. The method of claim 7 wherein said extruded material is hardened by treatment with steam at a pressure in the range of from 220 to 240 p.s.i.g.

9. The method of claim 1 wherein said bituminous material is bitumen.

* * * * *